(12) United States Patent
Chen

(10) Patent No.: US 7,325,661 B2
(45) Date of Patent: Feb. 5, 2008

(54) HYDRAULIC FRONT FORK WITH LOCKOUT FUNCTION

(75) Inventor: Hui-Hsiung Chen, Taichung (TW)

(73) Assignee: Spinner Industry Co., Ltd., Taichung (TW)

( * ) Notice: Subject to any disclaimer, the term of this patent is extended or adjusted under 35 U.S.C. 154(b) by 91 days.

(21) Appl. No.: 11/296,221

(22) Filed: Dec. 8, 2005

(65) Prior Publication Data

US 2007/0068752 A1 Mar. 29, 2007

(30) Foreign Application Priority Data

Sep. 27, 2005 (TW) .............................. 94216655 U

(51) Int. Cl.
*F16F 9/32* (2006.01)
(52) U.S. Cl. .................... 188/300; 188/299.1; 280/276
(58) Field of Classification Search .. 188/266.1–266.3, 188/282.9, 284, 285, 289, 317, 319.2, 322.22, 188/265, 300, 299.1; 280/276
See application file for complete search history.

(56) References Cited

U.S. PATENT DOCUMENTS

| | | | | |
|---|---|---|---|---|
| 2,780,321 A | * | 2/1957 | Sturari | .................... 188/282.9 |
| 3,528,532 A | * | 9/1970 | Moskow | ..................... 188/300 |
| 4,671,392 A | * | 6/1987 | Wossner | .................. 188/266.3 |
| 6,105,987 A | * | 8/2000 | Turner | ........................ 280/276 |
| 6,120,049 A | * | 9/2000 | Gonzalez et al. | ........... 280/276 |
| 6,217,049 B1 | * | 4/2001 | Becker | ........................ 280/276 |
| 6,382,370 B1 | * | 5/2002 | Girvin | ..................... 188/299.1 |
| 2006/0090973 A1 | * | 5/2006 | Potas | .......................... 188/315 |

* cited by examiner

*Primary Examiner*—Robert A. Siconolfi
*Assistant Examiner*—Vu Q. Nguyen
(74) *Attorney, Agent, or Firm*—Bacon & Thomas, PLLC

(57) ABSTRACT

A hydraulic front fork includes a fixed locking mechanism mounted in the upper fork tube, and a first adjustment mechanism mounted in the top end of the upper fork tube adjustable to control the flowing path of the hydraulic fluid through the locking mechanism such that the bicycle is suitable for running on slopes and smooth road surfaces efficiently when the hydraulic fluid is locked out and prohibited from passing through the locking mechanism, and the hydraulic front fork can absorb shocks when the hydraulic fluid is allowed to pass through the locking mechanism.

11 Claims, 12 Drawing Sheets

HYDRAULIC FRONT FORK WITH LOCKOUT FUNCTION

BACKGROUND OF THE INVENTION

1. Field of the Invention

The present invention relates a bicycle front fork shock-absorbing structure and more particularly, to a hydraulic front fork that provides a locking function.

2. Description of the Related Art

A hydraulic type shock-absorbing front form for bicycle comprises an upper fork tube and a bottom fork tube axially coupled together, and a locking mechanism mounted on the inside. When the bicycle is moving over an uneven road surface to cause a relative movement between the upper fork tube and the lower fork tube, the internal hydraulic fluid is forced through the locking mechanism to change the flow path, thereby absorbing the shocks to provide a comfortable riding effect.

FIG. 1 shows a hydraulic front fork according to the prior art. According to this design, the front fork 1 has the inside space filled with a hydraulic fluid. Further, the front fork 1 comprises an upper fork tube 2, a bottom fork tube 3, a valve bush 4, which is fixedly mounted in the bottom side of the upper fork tube 2 and has one inlet 4a and two return-flow holes 4b, a flap 5 fastened to the bottom side of the valve bush 4 and adapted to cover the return-flow holes 4b, a needle valve 6, which is axially mounted in the upper fork tube 2 and has a conical front end 6a facing the top end of the inlet 4a and a rear end 6b extending out of the top end of the upper fork tube 2 for driving by an external force to adjust the pitch between the front end 6a and the top end of the inlet 4a and to further achieve changing of the flow rate and speed of the hydraulic fluid passing through the valve bush 4.

When the front end 6a is stopped against the inlet 4a to block the passage and when the upper fork tube 2 and the bottom fork tube 3 are moved relative to each other (i.e., the bicycle is moving over an uneven road surface), the needle valve 6 receives an impact force from the hydraulic fluid that flows upwards through the inlet 4a. Under the repeated impact effect of the hydraulic fluid, the connection area between the needle valve 6 and the upper fork tube 2 becomes loosened quickly.

SUMMARY OF THE INVENTION

The present invention has been accomplished under the circumstances in view. It is therefore the main object of the present invention to provide a hydraulic front fork, which prevents loosening of the structure due to rushing of the hydraulic fluid when the locking mechanism is set in the lockout status, thereby providing a comfortable riding effect.

To achieve this and other objects of the present invention, the hydraulic front fork comprises an upper fork tube, the upper fork tube having a top end and a bottom end; a bottom fork tube axially slidably coupled to the bottom end of the upper fork tube; a hydraulic fluid movable in between the upper fork tube and the bottom fork tube; and a locking mechanism immovably mounted inside the upper fork tube below the fluid level of the hydraulic fluid and dividing the upper fork tube into a first hydraulic fluid chamber and a second hydraulic fluid chamber, the locking mechanism comprising a valve body, the valve body having an axial center through hole disposed in communication with the first hydraulic fluid chamber, at least one return-flow holes disposed in communication between the axial center through hole and the second hydraulic fluid chamber, at least one side hole disposed in communication with the axial center through hole and the first hydraulic fluid chamber, an inner thread formed in a top end of the axial center through hole, and a shoulder formed in the axial center through hole below the outer thread, a piston axially movably mounted in the axial center through hole of the valve body, and spring means adapted to force the piston toward the second hydraulic fluid chamber; a first adjustment mechanism coupled to the top end of the upper fork tube remote from the bottom fork tube, the first adjustment mechanism comprising a rotary knob rotatably mounted on the top end of the upper fork tube, the rotary knob having a drive unit extending to the first hydraulic fluid chamber inside the upper fork tube, a control shaft, the control shaft having an outer thread threaded into the inner thread of the valve body, a front end terminating in a cone head, a rear end terminating in a driven unit and coupled to the drive unit of the rotary knob, a through hole, and at least one radial hole disposed in communication between the axial center through hole and the first hydraulic fluid chamber, and a discharge control device set mounted in the through hole of the control shaft, the discharge control device set comprising a stopper movable in the through hole of the control shaft and a spring member, which forces the stopper to block the passage between the through hole of the control shaft and the first hydraulic fluid chamber; wherein rotating the rotary knob clockwise/counter-clockwise causes the control shaft to be moved axially forwards/backwards between a lockout position where the front cone head of the control shaft is stopped at the shoulder in the axial center through hole of the valve body to block the passage through the axial center through hole of the valve body, and an open position where the front cone head of the control shaft is opened from the shoulder for allowing the hydraulic fluid to pass through the axial center through hole of the valve body.

DETAILED DESCRIPTION OF THE INVENTION

Figure 1:
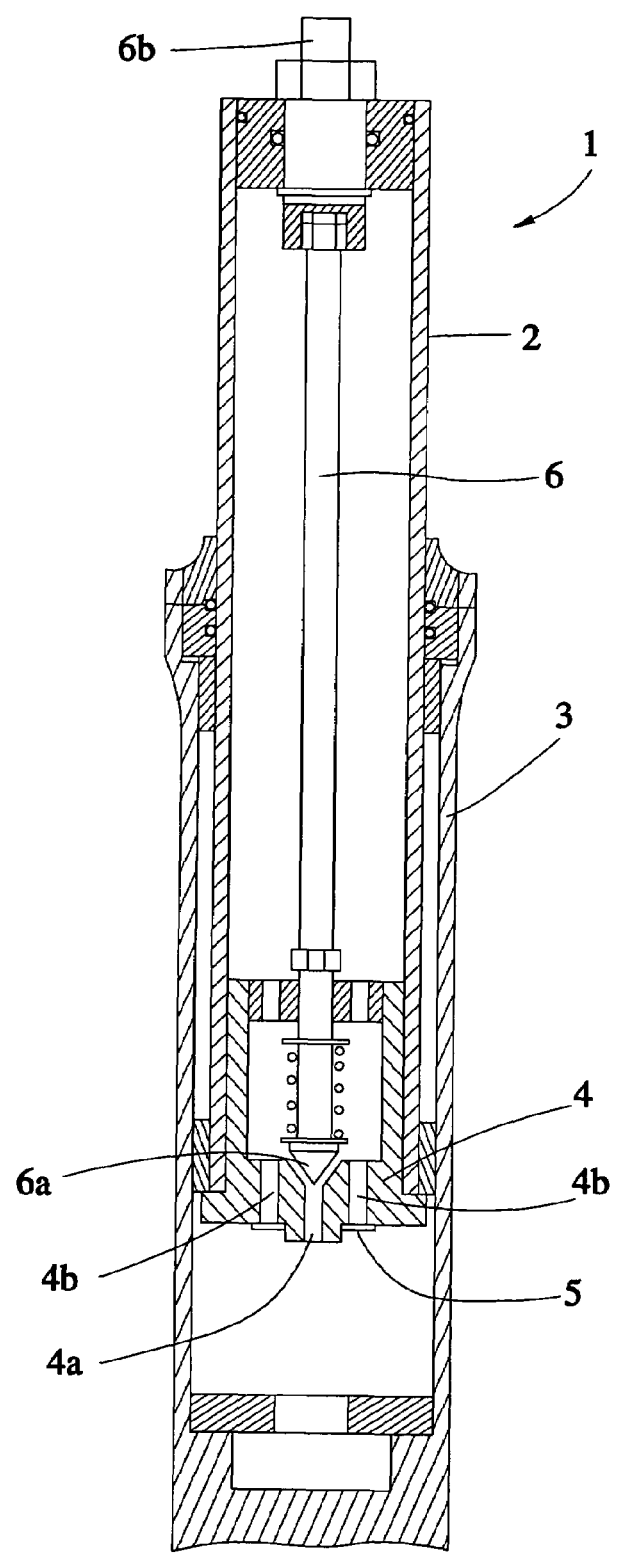
FIG. 1 is a sectional view of a front fork according to the prior art.
Figure 2:
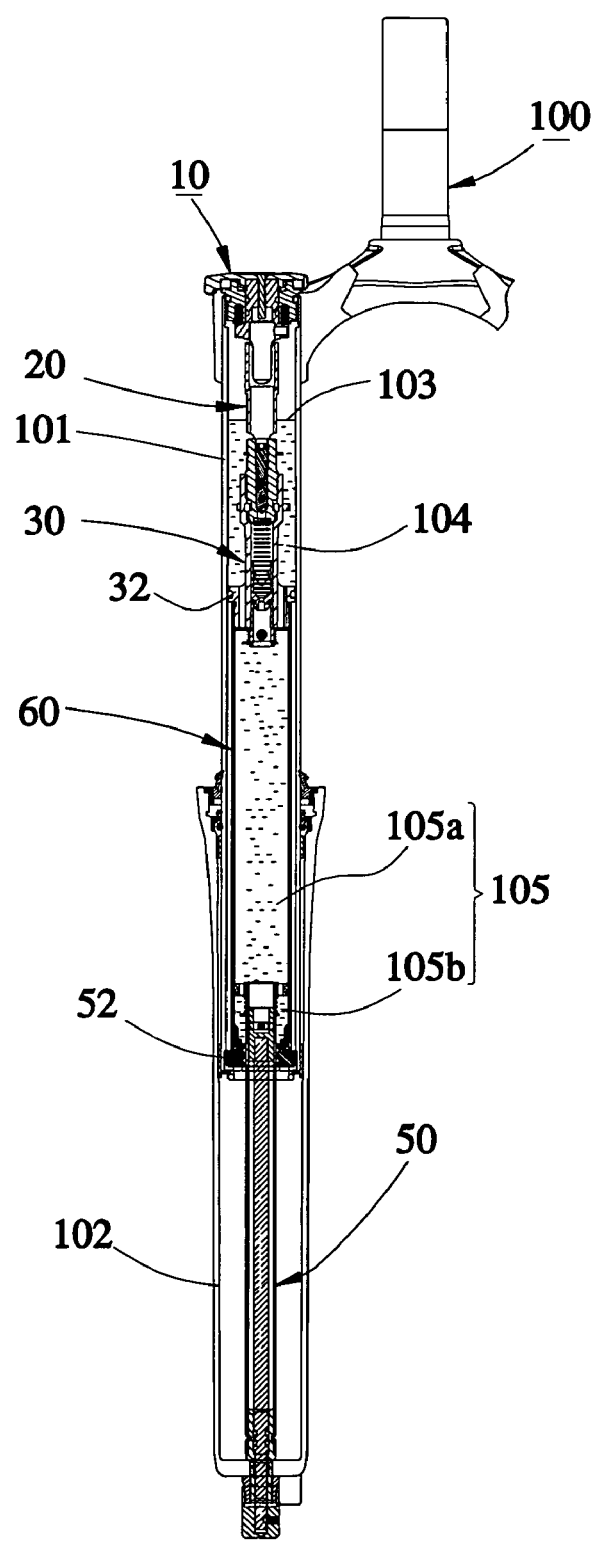
FIG. 2 is a sectional view of a hydraulic front fork according to the present invention.
Figure 3:
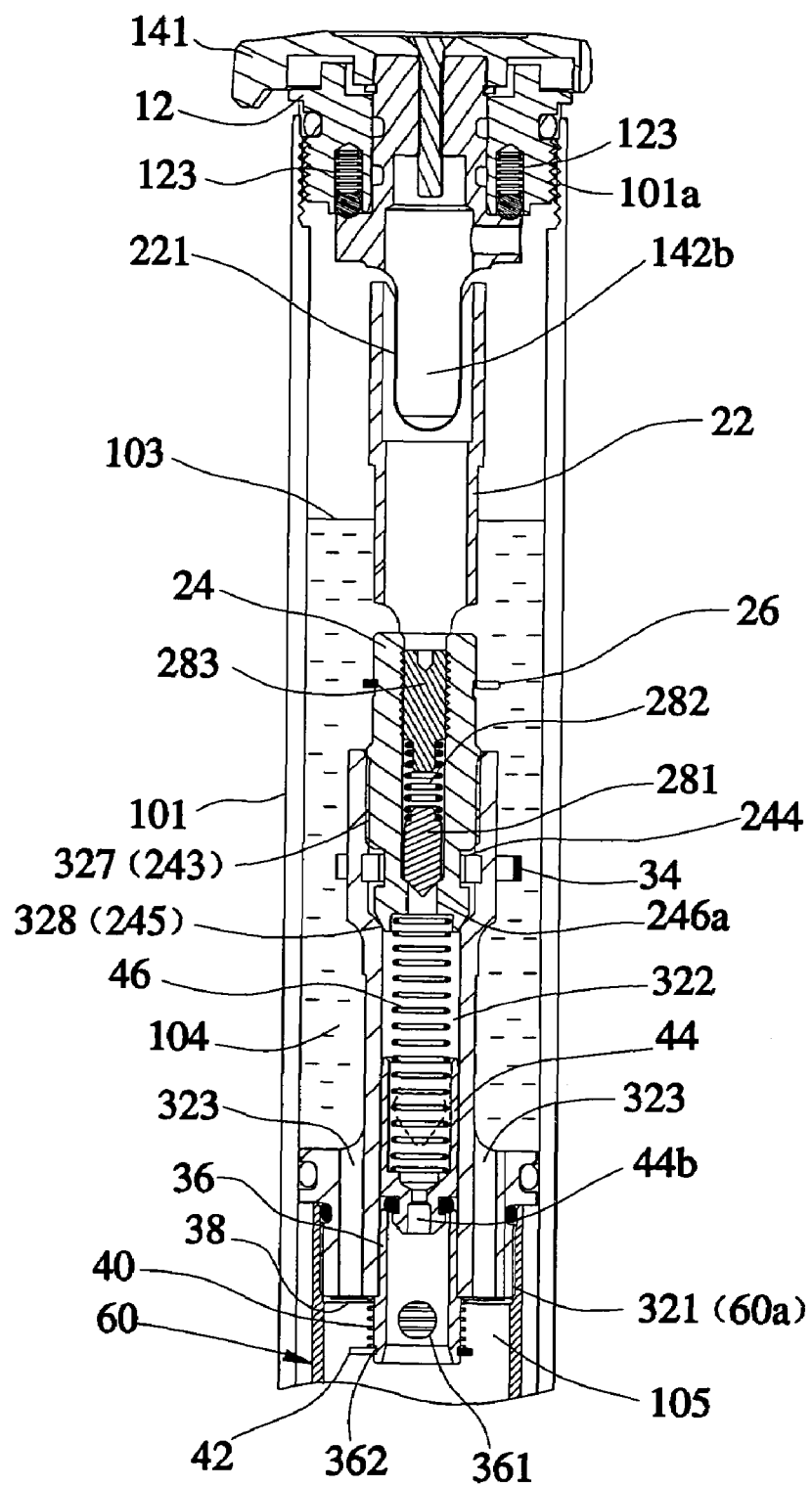
FIG. 3 is an enlarged view of the upper part of FIG. 2.

Referring to FIGS. 2 and 3, a hydraulic front fork 100 is shown comprising an upper fork tube 101, a bottom fork tube 102 partially sleeved onto the upper fork tube 101, a hydraulic fluid 103 filled in and movable between the upper fork tube 101 and the bottom fork tube 102, a first adjustment mechanism 10 mounted in the top end of the upper fork tube.101, a locking mechanism 30, a second adjustment mechanism 50, and an inner tube 60. The inner tube 60 is mounted inside the upper fork tube 101, having a first screw hole 60a and a second screw hole 60b respectively formed in the two distal ends. The first screw hole 60a is threaded onto the outer thread 321 of the valve body 32 of the locking mechanism 30. The second screw hole 60b is threaded onto the first outer thread 521 of the stepped end screw cap 52 of the second adjustment mechanism 50.

Figure 4:
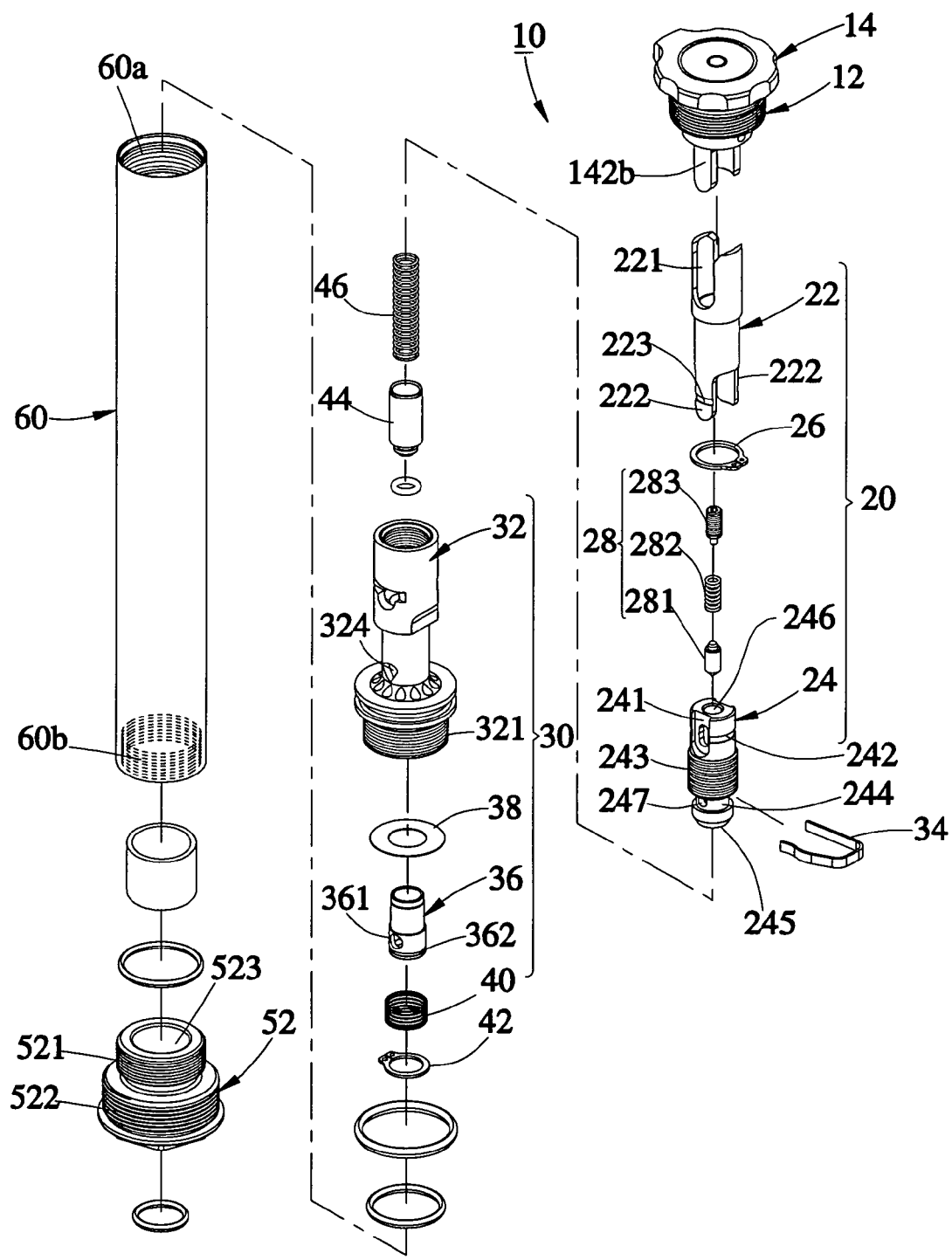
FIG. 4 is an exploded view of a part of the present invention.
Figure 5:
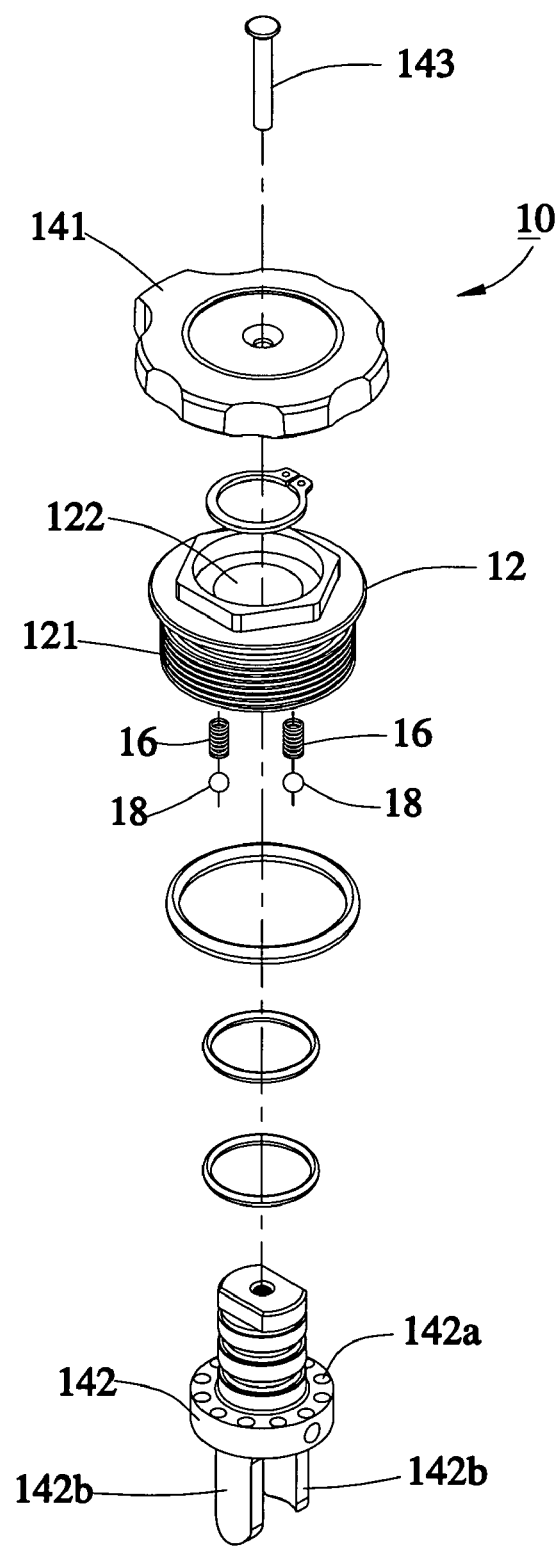
FIG. 5 is an exploded view of the first adjustment mechanism of the hydraulic front fork according to the present invention.

Referring to FIGS. 4 and 5 and FIG. 3 again, the first adjustment mechanism 10 comprises:

a top screw cap 12, which has a threaded shank 121 threaded into the top screw hole 101a of the upper fork tube 101, a center through hole 122, and two bottom countersunk holes 123;

a rotary knob 14, which comprises a handle 141, a base 142, which is upwardly inserted through the center through hole 122 of the top screw cap 12 and has a plurality of recessed locating holes 142a equiangularly spaced around the center axis thereof and disposed at the bottom side of the top screw cap 12 and two bottom drive rods 142b that form a driving unit, and a tie pin 143 fastened to the handle 141 and the base 142 to secure the handle 141 and the base 142 together;

two spring members 16 respectively mounted in the bottom countersunk holes 123 of the top screw cap 12;

two steel balls 18 respectively supported on the spring members 16 at the bottom side and selectively engaged into the recessed locating holes 142a subject to the control of the rotary knob 14;

a control shaft 20, which comprises a cylindrical transmission member 22, which has two recessed top receiving portions 221 that form a driven unit and are respectively coupled to the bottom drive rods 142b of the base 142 of the rotary knob 14, two symmetrical bottom extension strips 222, and two retaining groove 223 respectively formed on the periphery of the bottom extension strips 222, and a locking valve 24, which has two coupling grooves 241 respectively coupled to the bottom extension strips 222 of the cylindrical transmission member 22, two retaining grooves 242 extending around the periphery and connected between the two coupling grooves 241 at two opposite sides, an outer thread 243 extending around the periphery below the elevation of the coupling grooves 241, a bottom cone head 245, a neck 244 connected between the outer thread 243 and the bottom cone head 245, an axial center through hole 246, which extends axially through the top and bottom ends thereof, the locking valve 24 and has a narrow diameter portion 246a, and two radial holes 247 disposed at two opposite sides in communication between the axial center through hole 246 and a first hydraulic fluid chamber 104 defined in the upper fork tube 101;

a C-shaped retainer 26 fastened to the retaining grooves 223 of the cylindrical transmission member 22 and the retaining grooves 242 of the locking valve 24 to secure the cylindrical transmission member 22 and the locking valve 24 together; and a discharge control device set 28, which is mounted in the axial center through hole 246 of the locking valve 24, comprising a locating block 283 fixedly fastened to the axial center through hole 246 near the top, a stopper 281 adapted to stop the narrow diameter portion 246a of the axial center through hole 246 to further block the passage between the axial center through hole 246 and the first hydraulic fluid chamber 104, and a spring member 282 set in the axial center through hole 246 between the locating block 283 and the stopper 281 to force the stopper 281 against the narrow diameter portion 246a.

When rotating the rotary knob 14 of the first adjustment mechanism 10, the control shaft 20 is rotated with the rotary knob 14 in the same direction.

The locking mechanism 30 is mounted in the top end of the inner tube 60 below the fluid level of the hydraulic fluid 103, dividing the inside space of the upper fork tube 101 into a first hydraulic fluid chamber 104 and a second hydraulic fluid chamber 105. As shown in FIG. 2, the second hydraulic fluid chamber 105 is defined inside the inner tube 60 between the valve body 32 of the locking mechanism 30 and the stepped end screw cap 52 of the second adjustment mechanism 50.

Figure 6:
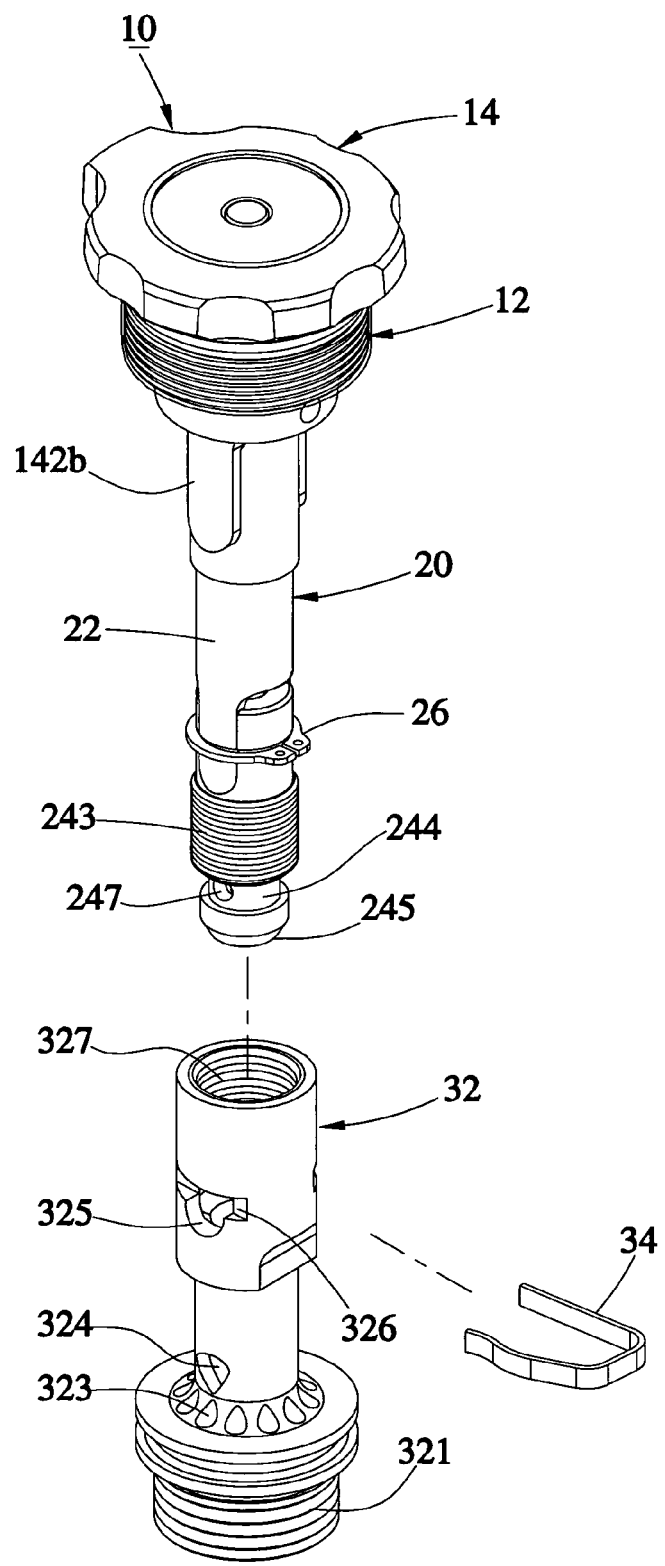
FIG. 6 is an elevational view of the first adjustment mechanism and the locking mechanism of the hydraulic front fork according to the present invention.

Referring to FIG. 6 and FIG. 3 again, the locking mechanism 30 comprises:

a valve body 32, which has an axial center through hole 322 disposed in communication with the first hydraulic fluid chamber 104, a plurality of return-flow holes 323 spaced around and disposed in communication with the first and the second hydraulic fluid chamber 104, 105, two side holes 324, which are symmetrical disposed in communication with the axial center through hole 322 at two opposite sides above the return-flow holes 323 (only one side hole 324 is shown) and made having a diameter gradually increasing in direction from the side close to the second hydraulic fluid chamber 105 toward the first hydraulic fluid chamber 104, two radial through holes 325 in communication with the axial center through hole 322, two peripheral grooves 326 respectively extending across the radial through holes 325, an inner thread 327 formed in the top end of the axial center through hole 322 and threaded onto the outer thread 243 of the locking valve 24 (see FIG. 3), and a shoulder 328 formed in the axial center through hole 322 below the outer thread 327;

a substantially U-shaped spring clamp 34 fastened to the peripheral grooves 326 of the valve body 32 and the neck 244 of the locking valve 24 to secure the locking valve 24 to the axial center through hole 322 of the valve body 32 for allowing axial movement of the locking valve 24 relative to the valve body 32 within a limited range subject to the vertical length of the neck 244;

a socket 36, which is press-fitted into the axial center through hole 322 of the valve body 32 from the bottom side, having two holes 361 respectively disposed below the return-flow holes 323 (only one hole 361 is shown in FIG. 3) and a retaining groove 362 extending around the periphery near the bottom side;

a valve flap 38 mounted on the periphery of the socket 36 before connection of the socket 36 to the valve body 32;

a retaining ring 42 fastened to the retaining groove 362 of the socket 36;

a spring member 40 sleeved onto the socket 36 and stopped between the valve flap 38 and the retaining ring 42 to support the valve flap 38 in the close position to close the return-flow holes 323;

a spring member 46 mounted in the axial center through hole 322 of the valve body 32 before connection of the locking valve 24 of the control shaft 20; and a piston 44, which is mounted in the axial center through hole 322 of the valve body 32 before connection of the locking valve 24 of the control shaft 20 to the valve body 32 and adapted to block the side holes 324 and to further stop the passage between the first hydraulic fluid chamber 104 and the second hydraulic fluid chamber 105 during the stage shown in FIG. 3, having a front end 44*a*, which is forced by the spring force of the spring member 46 against the socket 36 and a through hole 44*b* in the front end 44*a*.

Figure 11:
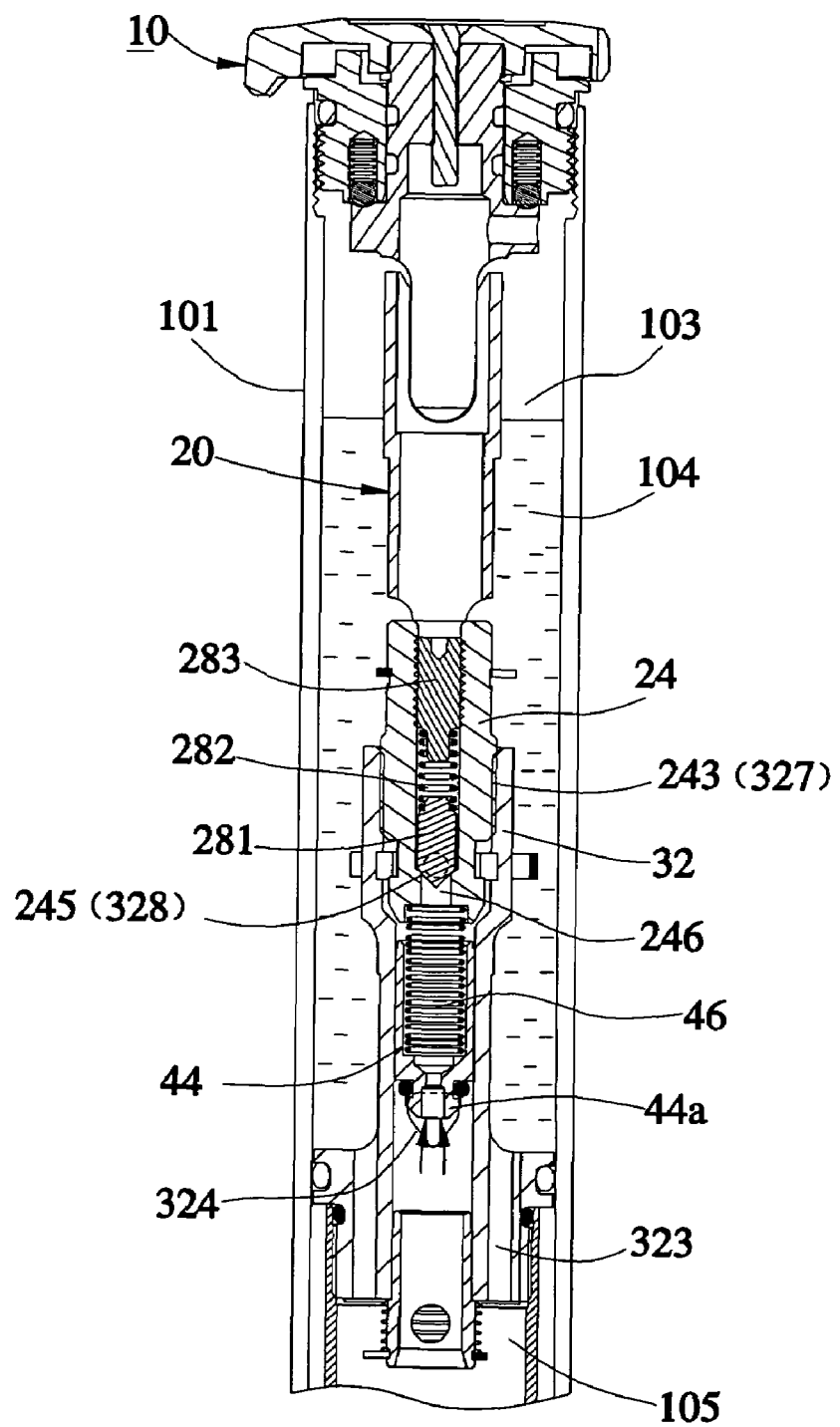

Referring to FIG. 11, when the hydraulic fluid 103 is forced through the return-flow holes 323 to push the valve flap 38 downwards, the hydraulic fluid 103 will pass through the holes 361 of the socket 36 toward the second hydraulic fluid chamber 105.

Figure 7:
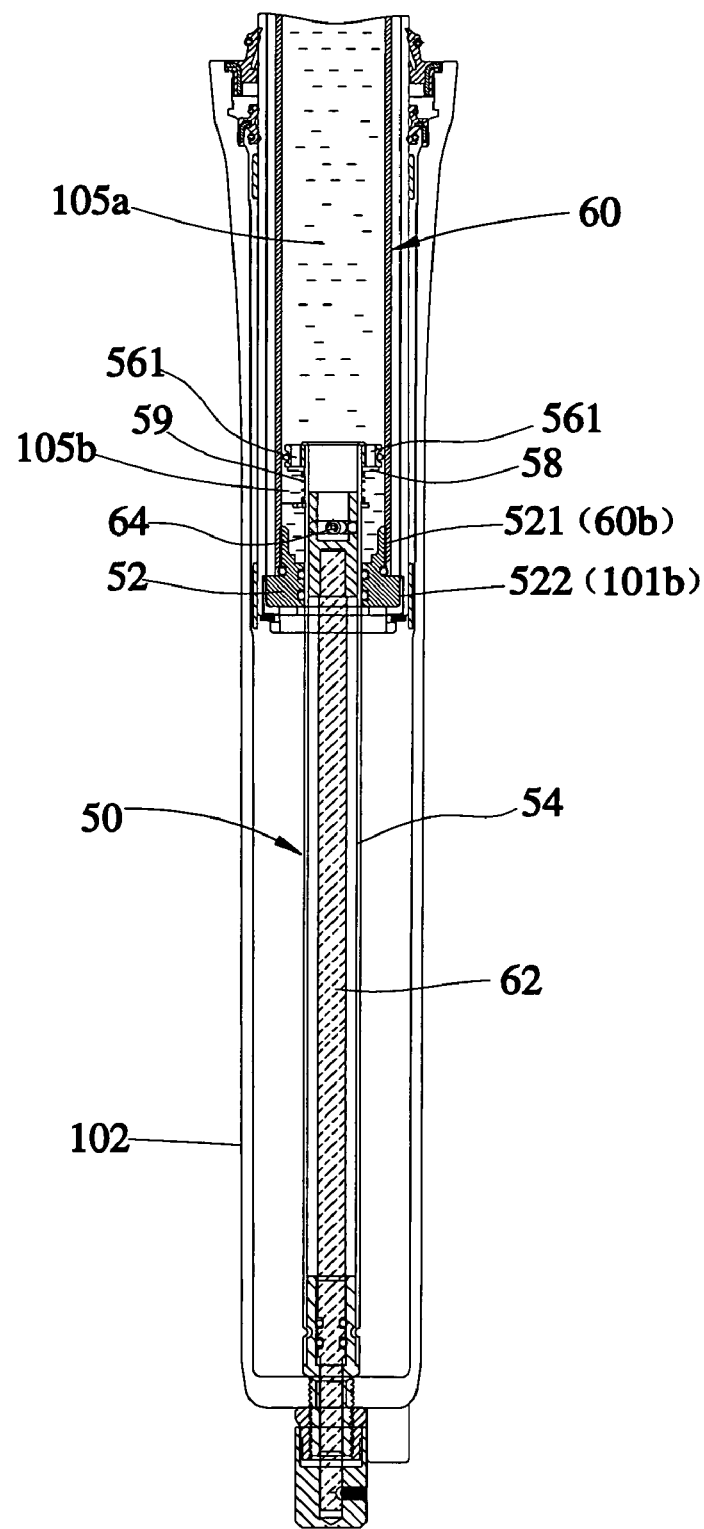
FIG. 7 is an enlarged view of the lower part of FIG. 2.
Figure 8:
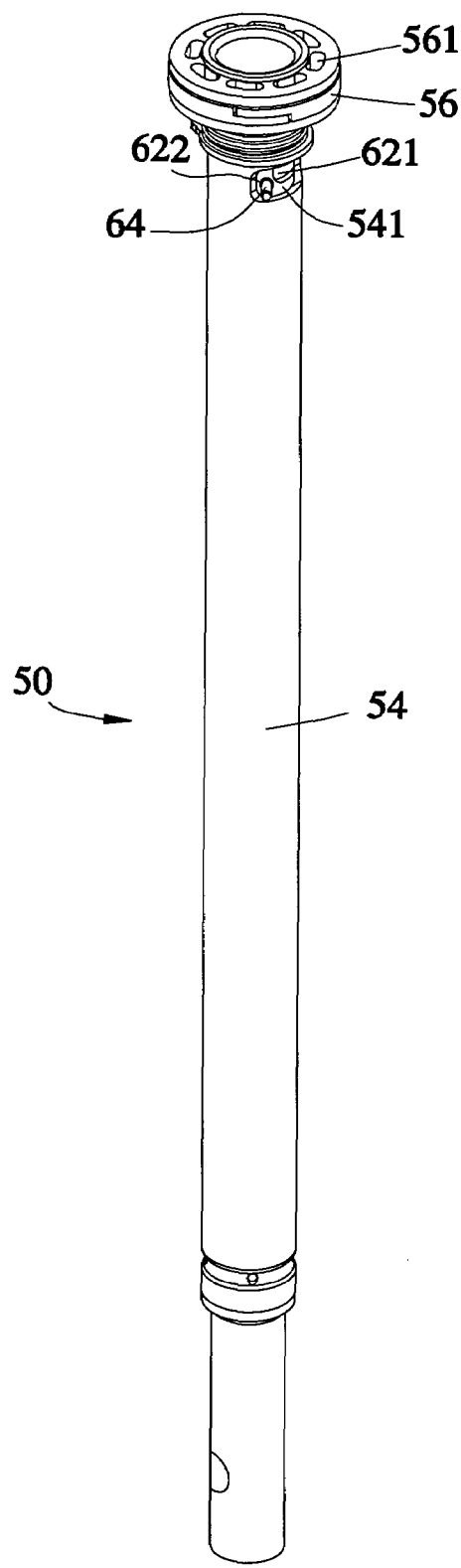
FIG. 8 is an exploded view of a part of the second adjustment mechanism of the hydraulic front fork according to the present invention.

Referring to FIGS. 7 and 8, the second adjustment mechanism 50 comprises:

a stepped end screw cap 52, which has a first outer thread 521 and a second outer thread 522 respectively threaded into the second screw hole 60*b* of the inner tube 60 and the bottom screw hole 101*b* of the upper fork tube 101 to secure the inner tube 60 and the locking mechanism 30 to the inside of the upper fork tube 101 and a axial center through hole 523;

a sleeve 54, which is inserted through the axial center through hole 523 of the stepped end screw cap 52, having a side hole 541 near the top end;

a damper 56, which is fixedly mounted in the top end of the sleeve 54 above the side hole 541 to divide the second hydraulic fluid chamber 105 into an upper space 105*a* and a lower space 105*b*, having a plurality of through holes 561 disposed in communication between the upper space 105*a* and the lower space 105*b*;

a spring member 59;

a valve flap 58 forced by the spring member 59 to block the through holes 561;

an axle 62, which is inserted into the sleeve 54, having a top notch 621 facing the side hole 541 of the sleeve 54 to let the upper space 105*a* be in communication with the lower space 105*b*, and a plughole 622 disposed adjacent to the top notch 621; and a locating pin 64 inserted through the side hole 541 of the sleeve 54 and fastened to the plughole 622 of the axle 62.

The bottom end of the axle 62 extends downwardly to the outside of the bottom fork tube 102 for enabling the axle 62 to be rotated by an external force to change the opening status of the notch 521 relative to the side hole 541 and to further control the flow rate of the hydraulic fluid 103.

The aforesaid locating pin 64 is movable with the axle 62 between the top and bottom ends of the side hole 541 to limit the damping force adjustment range.

The above statement describes the component parts of the hydraulic front fork 100 and their relative positioning. When rotating the rotary knob 14 clockwise or counter-clockwise, the locking valve 24 of the control shaft 20 is moved forwards or backwards relative to the valve body 32. As shown in FIG. 3, when the bottom cone head 245 of the locking valve 24 is stopped at the shoulder 328 in the axial center through hole 322 of the valve body 32, the hydraulic front fork 100 is held in a lockout status without buffer, suitable for running on a slope or smooth road surface to enhance the bicycle pedaling efficiency.

Figure 9:
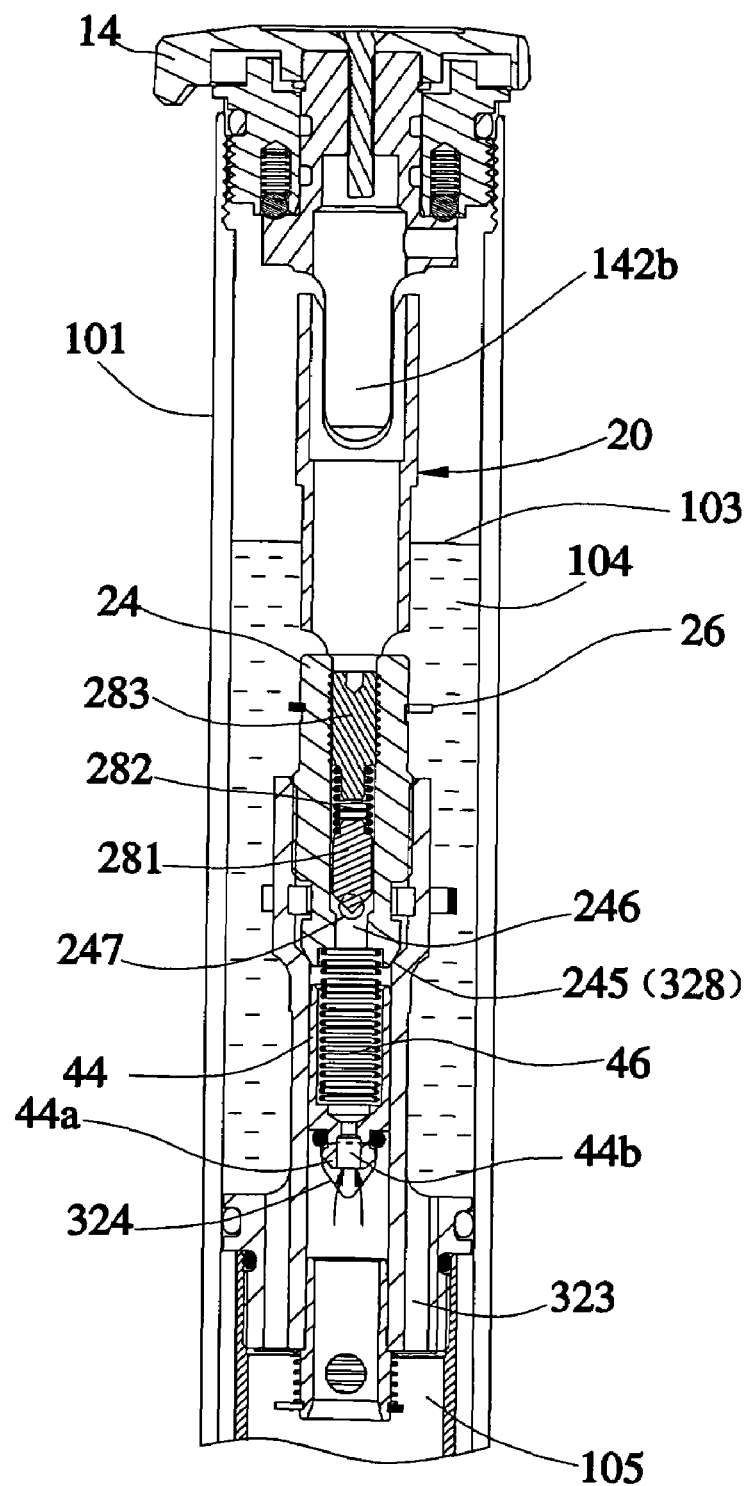
FIG. 9 is similar to FIG. 3 but showing the locking valve in the lockout status, the stopper and the piston slightly moved upwards.

When the bicycle encountered an unexpected uneven road surface under the aforesaid lockout status during running, the hydraulic fluid 103 in the second hydraulic fluid chamber 105 of the hydraulic front fork 100 is forced to push the piston 44 and the stopper 281 upwards, as shown in FIG. 9. At this time, the hydraulic fluid 103 passes through the side holes 324 and the radial holes 247 into the first hydraulic fluid chamber 104 to discharge the pressure instantly, preventing the production of an impact force against the component parts of the hydraulic front fork 100. After passed over the uneven road surface, the piston 44 and the stopper 281 are respectively returned to their former lockout position (see FIG. 3) by the respective spring members 46 and 282, keeping the hydraulic front fork 100 in the lockout status. Therefore, the invention provides a comfortable riding environment to the bicycle rider.

Figure 10:
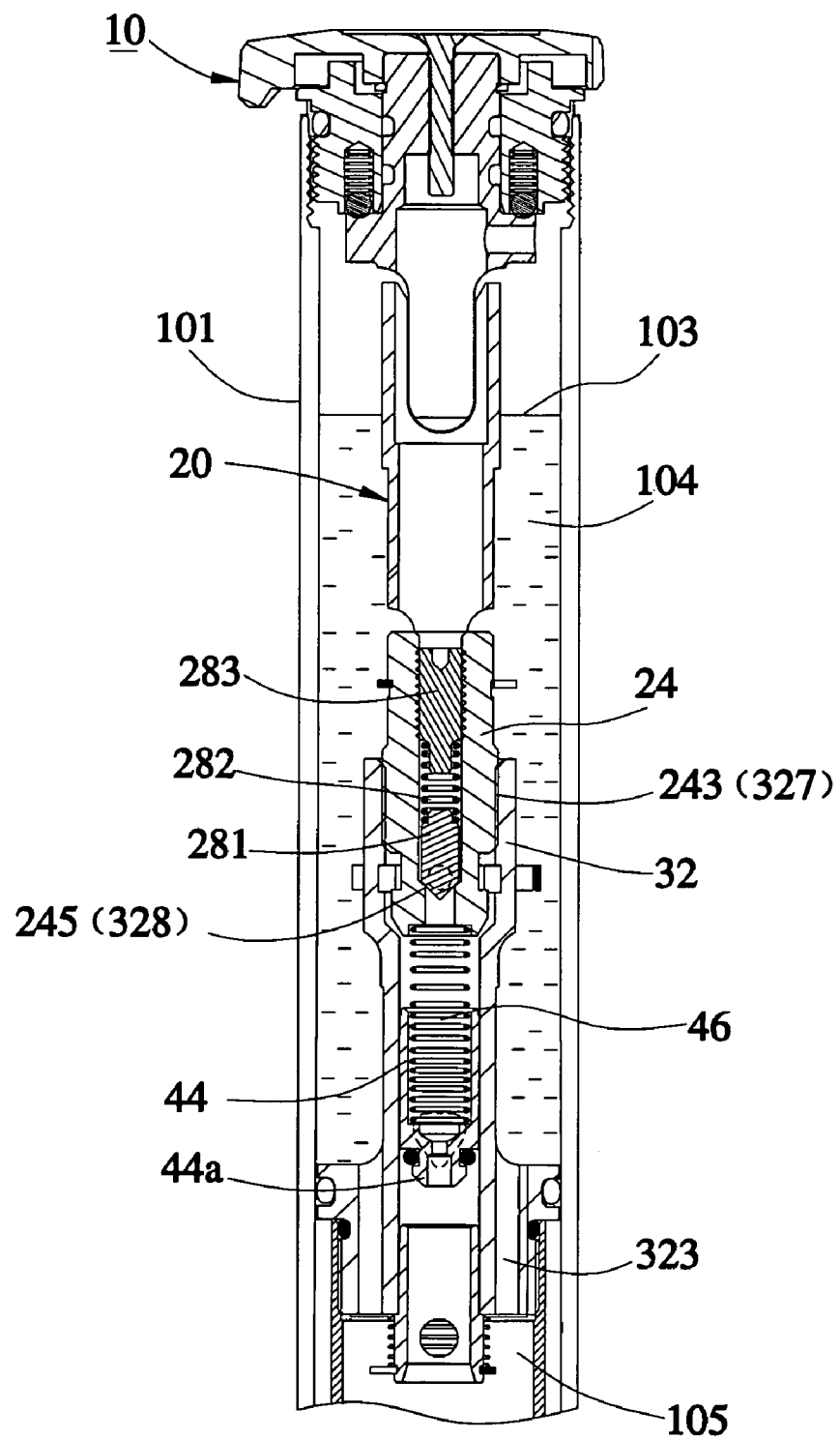
FIGS. 10 and 11 show the locking valve in the open status, the stopper in the lockout status, the piston moved upwards.

If the bicycle rider is going to ride the bicycle on an uneven road or ground area for a long distance, the bicycle rider can operate the first adjustment mechanism 10 to keep the bottom cone head 245 of the locking valve 24 spaced from the shoulder 328 of the valve body 32 at a distance. When the bicycle is moving over a small and moderately curved uneven road surface area at this time, the piston 44 will be forced to move slightly upwards (see FIG. 10). When the bicycle is moving over a sharply curved uneven road surface area, the piston 44 will be forced upwards at a rush to increase the opening status of the side holes 324 (see FIG. 11), enabling the hydraulic fluid 103 to pass through the side holes 324 at a gradually increasing flow rate to buffer and absorb shocks. Further, the K value of the coefficient of elasticity of the spring member 282 surpasses the K value of the coefficient of elasticity of the spring member 46. Therefore, unless encountering a sharp geographic change in the way, the stopper 281 is normally kept in the lockout status when the bicycle is moving on an uneven road surface or ground area for a long distance.

Figure 12:
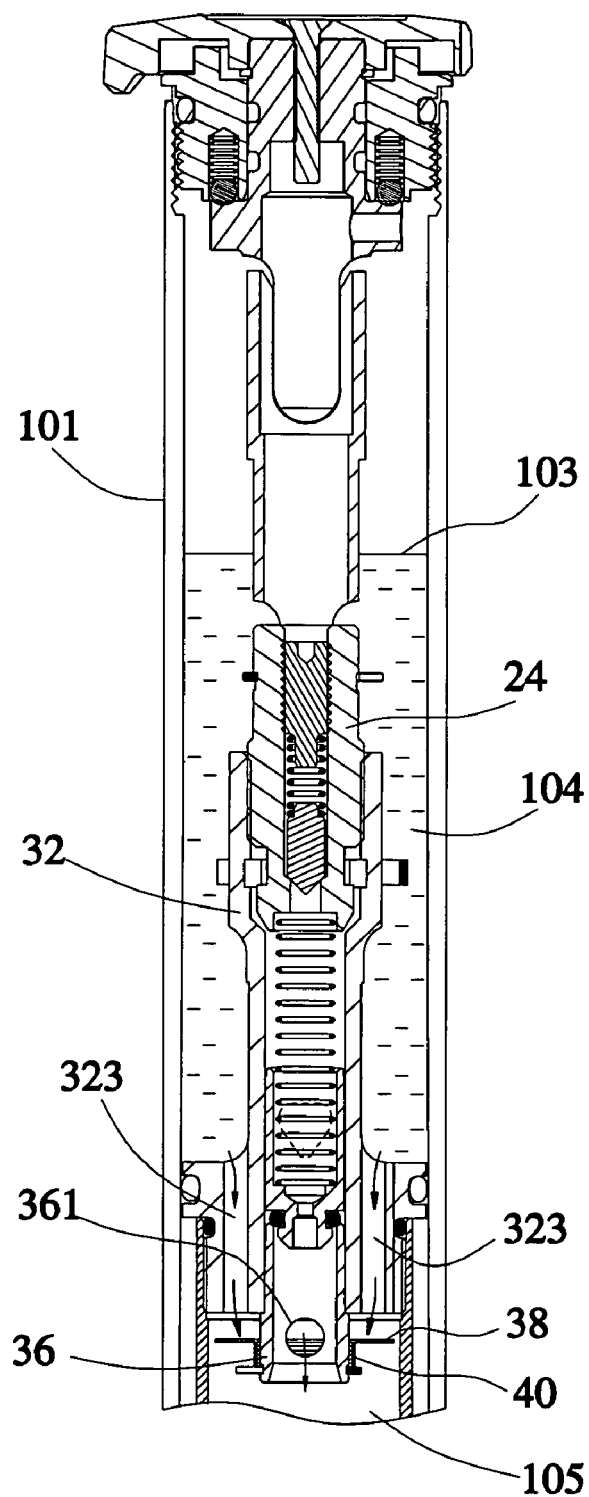
FIG. 12 is similar to FIG. 3, showing downward movement of the hydraulic fluid.

FIG. 12 shows the bottom fork tube 102 moved relative to the upper fork tube 101 and returned to the former position. At this time, the hydraulic fluid 103 flows from the first hydraulic fluid chamber 104 back to the second hydraulic fluid chamber 105 through the return-flow holes 323 and the holes 361 of the socket 36, keeping the upper fork tube 101 and the bottom fork tube 102 in balance.

Further, the second adjustment mechanism 50 that is adapted to push the hydraulic fluid 103 in the second hydraulic fluid chamber 104 acts in accordance with the first adjustment mechanism 10, for enabling the hydraulic front fork 100 to be accurately adjusted to the desired damping resistance. Further, the design of the present invention can reduce the use of the amount of the hydraulic fluid, thereby lowering the total weight of the hydraulic front fork.

Although a particular embodiment of the invention has been described in detail for purposes of illustration, various modifications and enhancements may be made without departing from the spirit and scope of the invention. Accordingly, the invention is not to be limited except as by the appended claims.

What is claimed is:

1. A hydraulic front fork comprising:
    an upper fork tube, said upper fork tube having a top end and a bottom end;
    a bottom fork tube axially slidably coupled to the bottom end of said upper fork tube;
    a hydraulic fluid movable in between said upper fork tube and said bottom fork tube; and
    a locking mechanism immovably mounted inside said upper fork tube below the fluid level of said hydraulic fluid and dividing said upper fork tube into a first hydraulic fluid chamber and a second hydraulic fluid chamber, said locking mechanism comprising a valve body, said valve body having an axial center through hole disposed in communication with said first hydraulic fluid chamber, at least one return-flow holes disposed in communication with said first and second hydraulic fluid chambers, at least one side hole disposed in communication with said axial center through hole and said first hydraulic fluid chamber, an inner thread formed in a top end of the axial center through hole, and a shoulder formed in said axial center through hole below said inner thread, a piston axially movably mounted in said axial center through hole of said valve body, and spring means adapted to force said piston toward said second hydraulic fluid chamber;

a first adjustment mechanism coupled to the top end of said upper fork tube remote from said bottom fork tube, said first adjustment mechanism comprising a rotary knob rotatably mounted on the top end of said upper fork tube, said rotary knob having a drive unit extending to said first hydraulic fluid chamber inside said upper fork tube, a control shaft, said control shaft having an outer thread threaded into the inner thread of said valve body, a front end terminating in a cone head, a rear end terminating in a driven unit and coupled to the drive unit of said rotary knob, a through hole, and at least one radial hole disposed in communication between the axial center through hole and said first hydraulic fluid chamber, and a discharge control device set mounted in the through hole of said control shaft, said discharge control device set comprising a stopper movable in the through hole of said control shaft and a spring member, which forces said stopper to block the passage between the through hole of said control shaft and said first hydraulic fluid chamber;

wherein rotating said rotary knob clockwise/counter-clockwise causes said control shaft to be moved axially forwards/backwards between a lockout position where said cone head of said control shaft is stopped at said shoulder in said axial center through hole of said valve body to block the passage through said axial center through hole of said valve body, and an open position where said cone head of said control shaft is positioned away from said shoulder for allowing said hydraulic fluid to pass through said axial center through hole of said valve body.

2. The hydraulic front fork as claimed in claim 1, further comprising a second adjustment mechanism, said second adjustment mechanism comprising:

a bottom end cap fixedly fastened to the bottom end of said upper fork tube;

a sleeve inserted through said bottom end cap, said sleeve having a side hole;

a damper fixedly mounted in said sleeve above the side hole of said sleeve to divide said second hydraulic fluid chamber into an upper space and a lower space, said damper having a plurality of through holes disposed in communication between said upper space and said lower space; and an axle inserted into said sleeve, said axle having a top notch in communication between the side hole of said sleeve and said lower space of said second hydraulic fluid chamber, and a bottom end extending out of a bottom side of said bottom fork tube for rotation by an external force.

3. The hydraulic front fork as claimed in claim 2, further comprising an inner tube mounted inside said upper fork tube, said inner tube having a top end fixedly fastened to the valve body of said locking mechanism, and a bottom end fixedly connected to said bottom end cap of said second adjustment mechanism, said inner tube defining with said valve body of said locking mechanism and said bottom end cap of said second adjustment mechanism said second hydraulic fluid chamber.

4. The hydraulic front fork as claimed in claim 2, wherein said axle has a plughole; said second adjustment mechanism further comprises a locating pin, said locating pin has one end fastened to the plughole of said axle and an opposite end extending out of the side hole of said sleeve.

5. The hydraulic front fork as claimed in claim 1, wherein said locking mechanism further comprises a socket press-fitted into the axial center through hole of said valve body below said piston, said socket having at least one hole disposed below said at least one return-flow hole and a retaining groove extending around the periphery thereof, a valve flap mounted on the periphery of said socket, a retaining ring fastened to the retaining groove of said socket, and a spring member sleeved onto said socket and stopped between said valve flap and said retaining ring to support said valve flap in a close position to close said at least one return-flow hole.

6. The hydraulic front fork as claimed in claim 5, wherein the side hole of said valve body has a diameter gradually increasing in direction from a first end thereof, which is close to said second hydraulic fluid chamber, toward a second end thereof, which is close to said first hydraulic fluid chamber; said piston is forced by the spring means of said locking mechanism against said socket to block said at least one side hole of said valve body.

7. The hydraulic front fork as claimed in claim 6, wherein said piston has a through hole in communication with said first hydraulic fluid chamber and said second hydraulic fluid chamber.

8. The hydraulic front fork as claimed in claim 1, wherein said drive unit of said rotary knob is comprised of two symmetrical drive rods; said control shaft comprises a transmission member and a locking valve, said transmission member having two recessed top receiving portions respectively coupled to the drive rods of said rotary knob and two symmetrical bottom extension strips, said locking valve having two coupling grooves respectively coupled to the bottom extension strips of said transmission member, and a neck connected between said cone head and said outer thread of said control shaft, the through hole and at least one radial hole of said control shaft are respectively formed in said locking valve.

9. The hydraulic front fork as claimed in claim 8, wherein said valve body having at least one peripheral groove disposed in communication with the axial center through hole of said valve body; said locking mechanism further comprises a spring clamp fastened to the at least one peripheral groove of said valve body and the neck of said locking valve to secure said locking valve to said valve body for allowing axial movement of said locking valve relative to said valve body within a limited range, said spring clamp having a width smaller than the width of said neck.

10. The hydraulic front fork as claimed in claim 8, wherein said first adjustment mechanism comprises a top end cap fixedly fastened to the top end of said upper fork tube; said rotary knob comprises a handle suspending above said top end cap, and a base upwardly inserted through said top end cap and connected to said handle, said base having a part forming said two drive rods.

11. The hydraulic front fork as claimed in claim 10, wherein said base has a plurality of equiangularly spaced recessed locating holes; said first adjustment mechanism further comprises at least one spring member respectively mounted in said top end cap, and at least one steel ball respectively supported on the at least one spring member of said first adjustment mechanism and forced by the respective spring member to selectively engage into one of said recessed locating holes of said base.

* * * * *